United States Patent [19]

Dauvergne

[11] 4,232,519
[45] Nov. 11, 1980

[54] ASSISTED BRAKING DEVICE

[75] Inventor: Jean L. R. Dauvergne, Fosses, France

[73] Assignee: Societe Anonyme Francaise du Ferodo, Paris, France

[21] Appl. No.: 963,919

[22] Filed: Nov. 21, 1978

[30] Foreign Application Priority Data

Nov. 28, 1977 [FR] France ............................ 77 35691

[51] Int. Cl.³ .............................................. B60T 13/20
[52] U.S. Cl. .......................................... 60/550; 60/551
[58] Field of Search .................. 60/547 R, 550, 551, 60/594; 91/391 R

[56] References Cited

U.S. PATENT DOCUMENTS

| 1,997,062 | 4/1935 | Huffman | 60/551 |
| 2,846,031 | 8/1958 | Kelley | 60/550 |
| 2,976,849 | 3/1961 | Stelzer | 60/550 |
| 3,707,075 | 12/1972 | Cripe | 60/550 |

FOREIGN PATENT DOCUMENTS

| 494939 | 4/1950 | Belgium | 60/547 R |
| 2411701 | 9/1975 | Fed. Rep. of Germany | 60/551 |
| 2449612 | 4/1976 | Fed. Rep. of Germany | 60/551 |

*Primary Examiner*—Abraham Hershkovitz
*Attorney, Agent, or Firm*—Young & Thompson

[57] ABSTRACT

An assisted braking device comprises a master cylinder and piston for applying the brakes. Depression of a brake pedal is arranged to move the master piston and to control brake assisting means to assist in the movement of the master piston. The assisted braking device is arranged such that if the brake assisting means is defective a driver can still effectively displace the master piston by applying the brake pedal. In this respect a safety rod is connected between a pedal lever of the brake pedal and the master piston independently of the brake assisting means and is arranged to be actuated if the assisting means break down.

9 Claims, 5 Drawing Figures

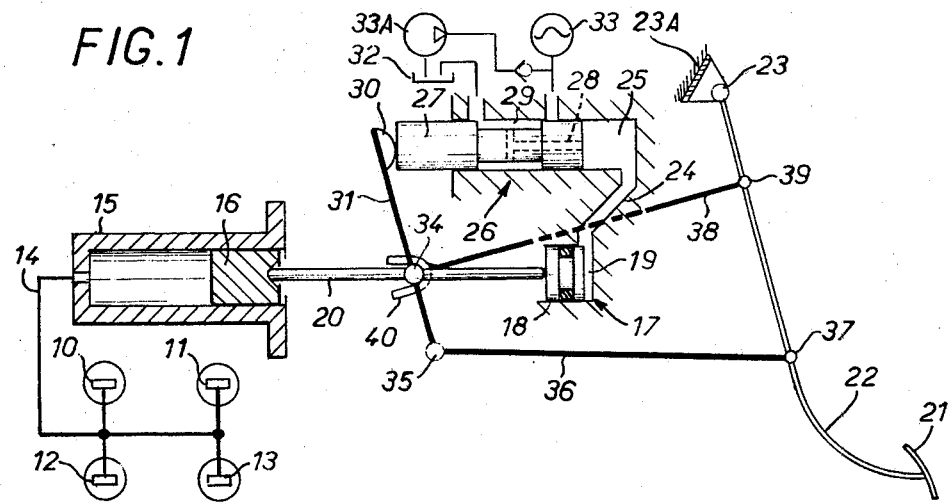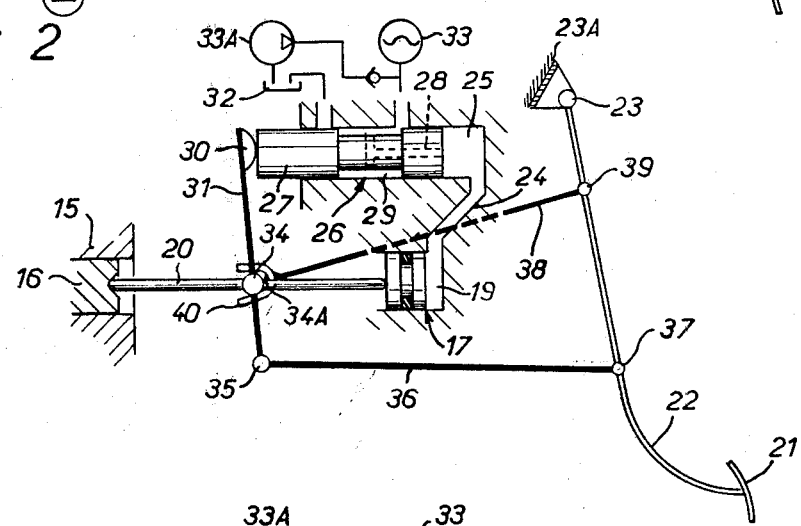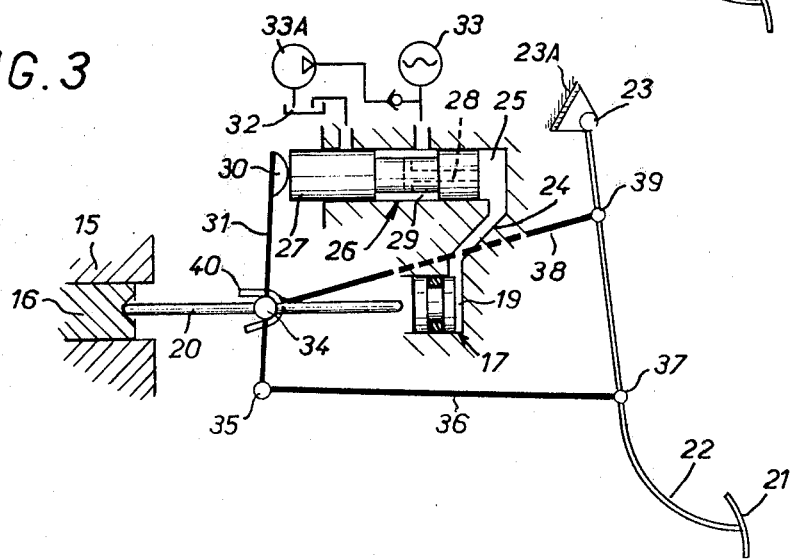

4,232,519

ASSISTED BRAKING DEVICE

BACKGROUND OF THE INVENTION

This invention relates to an assisted braking device of the kind comprising a master piston mounted slidably in a master cylinder, pilot means including a pedal mounted on a pivoted pedal lever, assisting means comprising a motor, one movable element of which is adapted to cooperate with the master piston via interconnecting means, an assistance energy source, a distributor adapted to supply the motor with assistance energy from the said source, control means adapted to control the distributor in response to the actuation of the pilot means and comprising an arm and a connecting rod, the arm acting on a movable element of the distributor and being articulated on the said interconnecting means, the connecting rod connecting the pedal lever to the arm via two articulation points, and safety means which are actuated if the assisting means break down, so as to displace the master piston when a force is exerted on the pedal.

In the known devices of this kind, particularly those where the assistance system has a considerable effect, if the assistance system breaks down the driver may have to depress the pedal with an excessive force, so that these devices are not sufficiently safe.

In general, the solutions proposed hitherto for reducing the force which must be exerted by the driver when the assistance system is defective are unsatisfactory, since they still require considerable muscular strength on the part of the driver.

This invention relates to an assisted braking device wherein the contribution made by the driver's direct action on the pedal when the assistance breaks down is made safely and with moderate effort, thanks to a very simple, robust construction.

SUMMARY OF THE INVENTION

According to the invention, there is provided an assisted braking device of the kind hereinbefore described, in which the safety means comprise a rod which is independent of the distributor control means, one end of said rod being articulated on the pedal lever at an articulation point which is different from that of the connecting rod, and the other end of said rod being connected to the master piston independently of the motor. The point of articulation of the safety rod on the pedal lever is advantageously located nearer to the pivot of the said lever than the articulation point of the connecting rod on the pedal lever.

With this arrangement, reliable safety is ensured, because a solid mechanical member, i.e. the abovementioned rod, is suitably incorporated in the device so as to be independent of the motor.

In order to prevent the rod from interferring with the action of the distributor control means during normal operation and to prevent the distributor control means from interferring with the action of the rod during safety operation, there is advantageously provided both a one-way connection between the safety rod and the master piston and an unrestricted displacement of the movable element of the distributor caused by the control arm throughout the entire length of travel of this arm when the arm is moved by the safety rod.

BRIEF DESCRIPTION OF THE DRAWINGS

FIG. 1 is a diagrammatic view of an assisted braking device according to the invention, in the rest position;

FIG. 2 is a view analogous to FIG. 1 but in the course of normal braking with the assistance system in operation;

FIG. 3 is analogous to FIG. 2 but in the course of safety braking, whilst the assistance system is out of order;

DESCRIPTION OF THE PREFERRED EMBODIMENTS

Figure 4:
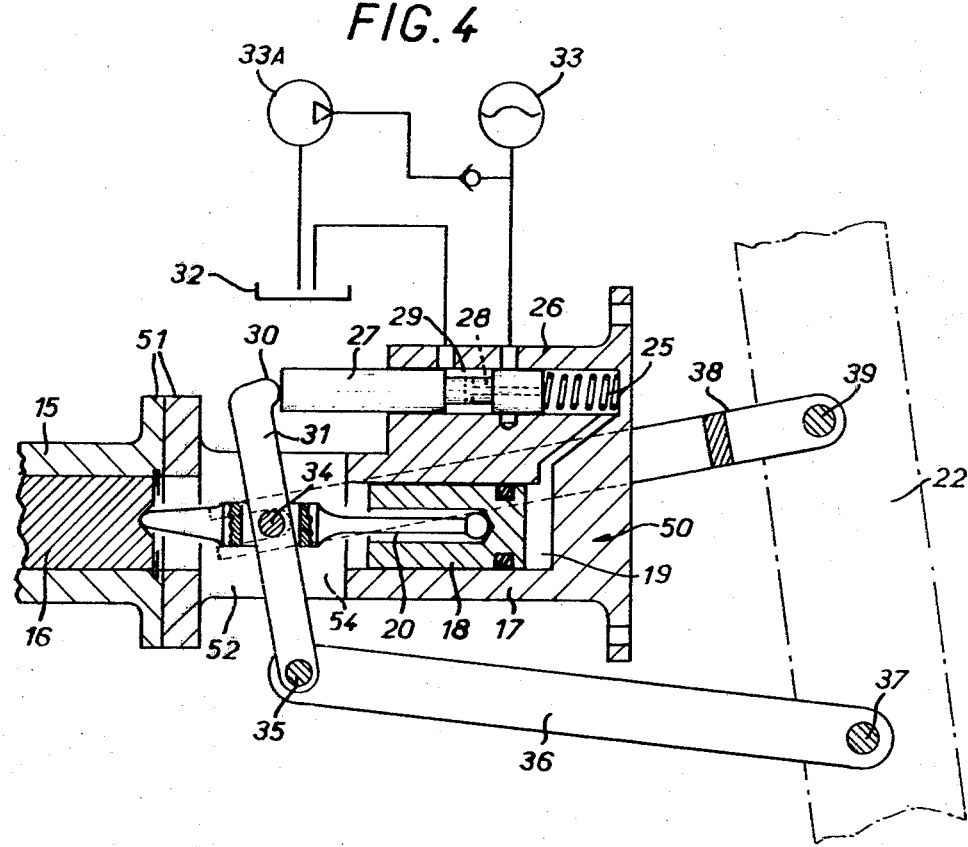
FIG. 4 is a section, to an enlarged scale, of a further embodiment of the device according to the invention.

Reference will be made first to FIGS. 1 to 3 which relate to an application of the invention, as a non-restrictive example, to the braking system of an automobile having four brakes 10, 11, 12, 13 supplied at 14 from a master cylinder 15 in which a master piston 16 is slidably mounted. Preferably, a double-circuit arrangement is provided (not shown).

A jack 17 is axially aligned with the master cylinder 15 and comprises a piston 18 defining a chamber 19. The piston 18 cooperates with the master piston 16 by interconnecting means 20 axially aligned with the master piston 16. In the embodiment illustrated these interconnecting means consist of a rod 20.

Pilot means comprise a brake pedal 21 available to the driver and located at the end of a pedal lever 22 which is pivotally mounted on a pivot 23 of the chassis 23A.

The hydraulic chamber 19 of the jack 17 is connected, via a line 24, to a chamber 25 of a distributor 26, the movable element of which is shown in the form of a slide-valve 27. The chamber 25 is defined by the slide-valve 27 and communicates, via a channel 28 provided in the slide-valve 27, with an intermediate annular groove 29 of the slide-valve 27.

The slide-valve is subjected to two opposing forces, one of which is developed by a thrust end 30 of an arm 31 and tends to displace it to the right in FIG. 1, whilst the other is developed by the hydraulic pressure in the chamber 25 and tends to displace it to the left in FIG. 1. The annular groove 29 is arranged to communicate either with a reservoir 32 or with a hydraulic assistance source 33, e.g. a pressure accumulator associated with a pump 33A, depending on the position of the slide-valve 27.

Control means for distributor 16 comprise the arm 31 and a connecting rod 36.

The arm 31 is articulated on a spindle 34 on the rod 20 and its end 35, which is opposite the end 30, is connected to the lever 22 by the connecting rod 36 which is articulated on this lever at an articulation point 37.

It will be appreciated that the jack 17 constitutes a motor the piston 18 of which is a movable element connected to the piston 16 by the rod 20. In the embodiment in FIG. 1, the motor 17 is hydraulic, but it could be of any other suitable type. It will also be appreciated that the accumulator 33 and the pump 33A constitute an assisting energy source which, in the example shown, is a source of hydraulic energy, but could also take any other appropriate form.

When the driver is not applying any pressure to the pedal 21, the connecting rod 36 is not urged to the left in FIG. 1 and the end 30 of the pivot arm does not exert any force on the slide-valve 27. The pressure source 33, 33A is isolated from the chambers 25 and 19 and these chambers are brought into communication with the reservoir 32 by way of the channel 28.

When the driver depresses the pedal 21, the connecting rod 36 moves to the left in FIG. 1 and the end 30 of the pivot arm 31 exerts a force on the slide-valve 27 which tends to displace it to the right. The chambers 25 and 19 are isolated from the reservoir 32 and the hydraulic energy source 33, 33A is brought into communication, in modulated manner, with the chambers 25 and 19, thus moving the unit 18, 20, 16 to the left and providing assisted braking.

Safety means are provided so that, if the assistance system breaks down, the driver can displace the master piston 16 by the effect of the force which he exerts directly on the pedal 21.

These safety means comprise a rod 38 which is interposed directly between the pilot means and the master piston 16. More particularly, the rod 38 is articulated on the lever 22 at a point 39 which is closer to the pivot 23 than the articulation point 37 of the connecting rod 36. At its other end, the safety rod 38 comprises a fork 40 which engages on the spindle 34 to form a one-way connection between this rod 38 and the rod 20 associated with the master piston 16.

During normal operation with the assistance system in action (FIG. 2), the rod 38 in no way interferes with the action of the arm 31 on the slide-valve 27. In fact, the spindle 34 is able simply to move away from the base 34A of the fork 40.

If the assistance system is defective (FIG. 3), the force on the pedal 21 has the effect of pushing the rod 38, hence the spindle 34, thus directly urging the rod 20 and master piston 16 to the left in FIG. 3. The arm 31 and the distributor 27, which have now become inoperative, do not interfere with this automatic intervention by the rod 38. In fact, the slide-valve 27 of the distributor 26 is free from all obstructions and is able to move unrestrictedly under the effect of the end 30 of the control arm 31 throughout the entire movement of the latter caused by the safety rod 38.

Under these conditions, the driver can benefit from improved safety braking, since the force he exerts on the pedal 21 for this safety braking can be designed as required so that it is effected under excellent safety conditions, keeping within the limits of the available distance of travel of the pedal. For this purpose, it is merely necessary to choose a suitable position for the articulation 39 of the rod 38 on the lever 22.

It should be noted that the slide-valve 27 of the distributor 26 is such that, at the end of the movement of the control arm 31 under the effect of the safey rod 38, the slide-valve 27 still allows communication between its groove 29 and the hydraulic energy source 33, 33A, so that the assistance system can start to be effective again as soon as the fault has been repaired.

Figure 5:
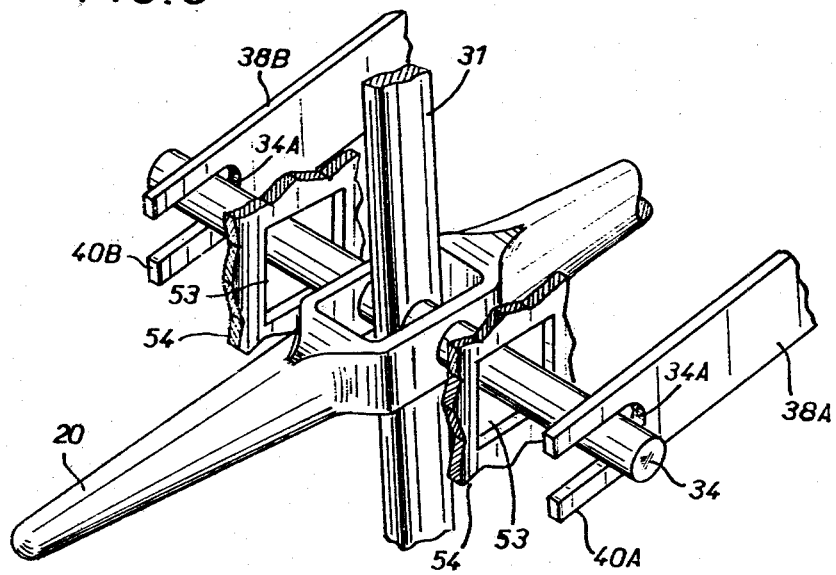
FIG. 5 is a perspective view, partially cut away, of part of the device shown in FIG. 4.

Reference will now be made to FIGS. 4 and 5 which show a further embodiment of the device according to the invention.

In this embodiment, the jack 17 and the distributor 26 have a common body 50 which is fixed by flanging at 51 to the body of the master cylinder 15. The body 50 comprises a wise central passage 52 through which the arm 31 passes freely. The spindle 34 passes freely through openings 53 provided in the lateral walls 54 of the body 50 at the site of the central passage 52. The spindle 34 projects beyond the body 50 on both sides.

The rod 38 is in the form of a yoke and has two branches 38A and 38B which extend either side of the body 50. These branches respectively have forks 40A and 40B at their ends, which engage the ends of the spindle 34.

It will be noted from FIG. 4 that the rod 20 allows the piston 18 of the jack 17 to act only one way on the master piston 16 so that, if the assistance system breaks down and the rod 38 acts directly on the spindle 34, the rod 20 does not drive this piston 18 needlessly.

The method of operation is analogous to that described hereinbefore.

It should be noted that the device according to the invention can conveniently be adapted to all sorts of assistance energy, both to hydraulic energy as described above and to electrical energy, for example, in which case the distributor 26 is in the form of a switch.

I claim:

1. An assisted braking device comprising a master cylinder, a common body fixed to said member cylinder and incorporating a motor and a distributor, a master piston mounted slidably in said master cylinder, pilot means including a pedal mounted on a pivoted pedal lever, assisting means comprising said motor, one movable element of which is adapted to cooperate with the master piston via interconnecting means, an assistance energy source, said distributor being adapted to supply the motor with assistance energy from the said source, control means adapted to control the distributor in response to the actuation of the pilot means and comprising an arm and a connecting rod, the arm acting on a movable element of the distributor and being articulated on the said interconnecting means, the connecting rod connecting the pedal lever to the arm via two articulation points, and safety means which are actuated if the assisting means break down, so as to displace the master piston under the effect of the action exerted on the pedal, the safety means comprising a safety rod which is independent of the distributor control means, one end of the safety rod being articulated on the pedal lever at an articulation point which is different from that of the connecting rod, and the other end of the safety rod being connected to the master piston independently of the motor.

2. An assisted braking device according to claim 1, in which the point of articulation of the safety rod on the pedal lever is located closer to the pivot of the latter than the articulation point of the connecting rod on the pedal lever.

3. An assisted braking device according to claim 1, in which the motor is a hydraulic jack, and the source of assistance energy is a source of hydraulic energy, the body of the jack being mounted on the body of the master cylinder and comprising a passage through which the distributor control means pass.

4. An assisted braking device according to claim 3, in which the safety rod is a yoke and extends either side of the body of the jack.

5. An assisted braking device according to claim 1, in which the safety rod is connected to the aster piston via a one-way connection.

6. An assisted braking device according to claim 2, in which the safety rod comprises at its end a fork which engages with a spindle which is integral with the interconnecting means, so as to form a one-way connection.

7. An assisted braking device according to claim 6, in which the spindle is an extension of the articulation of the control arm on the interconnecting means.

8. An assisted braking device according to claim 1, in which the distributor is such that its movable element can move unrestrictedly under the action of the control arm throughout the entire movement of the latter caused by the safety rod.

9. An assisted braking device according to claim 8, in which the distributor is hydraulic and its movable element consists of a slide-valve, this slide-valve being such that, at the end of the movement of the control arm under the action of the safety rod, it allows communication with the hydraulic energy source so as to enable the assisting means to operate again as soon as the fault has been repaired.

* * * * *